(12) United States Patent
Chui et al.

(10) Patent No.: US 7,554,714 B2
(45) Date of Patent: Jun. 30, 2009

(54) DEVICE AND METHOD FOR MANIPULATION OF THERMAL RESPONSE IN A MODULATOR

(75) Inventors: Clarence Chui, San Mateo, CA (US); Marc Mignard, Berkeley, CA (US)

(73) Assignee: IDC, LLC, San Francisco, CA (US)

( * ) Notice: Subject to any disclaimer, the term of this patent is extended or adjusted under 35 U.S.C. 154(b) by 239 days.

(21) Appl. No.: 11/149,920

(22) Filed: Jun. 10, 2005

(65) Prior Publication Data
US 2006/0077152 A1  Apr. 13, 2006

Related U.S. Application Data

(60) Provisional application No. 60/613,552, filed on Sep. 27, 2004.

(51) Int. Cl.
*G02F 1/01* (2006.01)
(52) U.S. Cl. ......................... 359/288; 356/450; 359/240
(58) Field of Classification Search ................. 359/288, 359/450; 356/450
See application file for complete search history.

(56) References Cited

U.S. PATENT DOCUMENTS

| | | |
|---|---|---|
| 2,534,846 A | 12/1950 | Ambrose et al. |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,725,868 A | 4/1973 | Malmer, Jr. et al. |
| 3,728,030 A | 4/1973 | Hawes |
| 3,813,265 A | 5/1974 | Marks |
| 3,955,190 A | 5/1976 | Teraishi |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |

(Continued)

FOREIGN PATENT DOCUMENTS

CN                157313            5/1991

(Continued)

OTHER PUBLICATIONS

Fan et al., "Channel Drop Filters in Photonic Crystals," Optics Express, vol. 3, No. 1, 1998.

(Continued)

*Primary Examiner*—Jessica T Stultz
(74) *Attorney, Agent, or Firm*—Knobbe, Martens Olson & Bear LLP

(57) ABSTRACT

By varying the spacing between two surfaces, one of which is disposed in front of the other, an interferometric modulator selectively creates constructive and/or destructive interference between light waves reflecting off the two surfaces. The desired spacing can be achieved by deforming one or both surfaces. A heating element associated with a particular surface causes the deformation by heating the material that forms one or both of the surfaces. By varying the amount of applied heat, the amount of deformation is varied, thus allowing the distance between the surfaces to be controlled and thereby creating constructive and/or destructive interference as desired.

21 Claims, 10 Drawing Sheets

U.S. PATENT DOCUMENTS

| | | |
|---|---|---|
| 4,392,711 A | 7/1983 | Moraw et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,666,254 A | 5/1987 | Itoh et al. |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Katagiri et al. |
| 4,900,136 A | 2/1990 | Goldburt et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,091,983 A | 2/1992 | Lukosz |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,258,821 A * | 11/1993 | Doggett et al. ............... 356/496 |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,315,370 A | 5/1994 | Bulow |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,328 A | 9/1994 | Fritz et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | Van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,441 A | 10/1995 | Florence et al. |
| 5,471,341 A | 11/1995 | Warde et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,614,937 A | 3/1997 | Nelson |
| 5,619,059 A | 4/1997 | Li et al. |

| Patent No. | Kind | Date | Inventor |
|---|---|---|---|
| 5,619,365 | A | 4/1997 | Rhoads et al. |
| 5,619,366 | A | 4/1997 | Rhoads et al. |
| 5,629,790 | A | 5/1997 | Neukermans et al. |
| 5,633,652 | A | 5/1997 | Kanbe et al. |
| 5,636,052 | A | 6/1997 | Arney et al. |
| 5,636,185 | A | 6/1997 | Brewer et al. |
| 5,638,084 | A | 6/1997 | Kalt |
| 5,638,946 | A | 6/1997 | Zavracky |
| 5,641,391 | A | 6/1997 | Hunter et al. |
| 5,646,729 | A | 7/1997 | Koskinen et al. |
| 5,646,768 | A | 7/1997 | Kaeiyama |
| 5,650,881 | A | 7/1997 | Hornbeck |
| 5,654,741 | A | 8/1997 | Sampsell et al. |
| 5,657,099 | A | 8/1997 | Doherty et al. |
| 5,659,374 | A | 8/1997 | Gale, Jr. et al. |
| 5,661,591 | A | 8/1997 | Lin et al. |
| 5,661,592 | A | 8/1997 | Bornstein et al. |
| 5,665,997 | A | 9/1997 | Weaver et al. |
| 5,673,139 | A | 9/1997 | Johnson |
| 5,683,591 | A | 11/1997 | Offenberg |
| 5,703,710 | A | 12/1997 | Brinkman et al. |
| 5,710,656 | A | 1/1998 | Goossen |
| 5,726,480 | A | 3/1998 | Pister |
| 5,739,945 | A | 4/1998 | Tayebati |
| 5,740,150 | A | 4/1998 | Uchimaru et al. |
| 5,745,193 | A | 4/1998 | Urbanus et al. |
| 5,745,281 | A | 4/1998 | Yi et al. |
| 5,751,469 | A | 5/1998 | Arney et al. |
| 5,771,116 | A | 6/1998 | Miller et al. |
| 5,784,190 | A | 7/1998 | Worley |
| 5,784,212 | A | 7/1998 | Hornbeck |
| 5,786,927 | A | 7/1998 | Greywall et al. |
| 5,793,504 | A | 8/1998 | Stoll |
| 5,808,780 | A | 9/1998 | McDonald |
| 5,808,781 | A | 9/1998 | Arney et al. |
| 5,818,095 | A | 10/1998 | Sampsell |
| 5,825,528 | A | 10/1998 | Goossen |
| 5,835,255 | A | 11/1998 | Miles |
| 5,838,484 | A | 11/1998 | Goossen et al. |
| 5,842,088 | A | 11/1998 | Thompson |
| 5,867,302 | A | 2/1999 | Fleming |
| 5,905,482 | A | 5/1999 | Hughes et al. |
| 5,912,758 | A | 6/1999 | Knipe et al. |
| 5,943,158 | A | 8/1999 | Ford et al. |
| 5,959,763 | A | 9/1999 | Bozler et al. |
| 5,986,796 | A | 11/1999 | Miles |
| 5,994,174 | A | 11/1999 | Carey et al. |
| 6,028,689 | A | 2/2000 | Michalicek et al. |
| 6,028,690 | A | 2/2000 | Carter et al. |
| 6,038,056 | A | 3/2000 | Florence et al. |
| 6,040,937 | A | 3/2000 | Miles |
| 6,046,840 | A | 4/2000 | Huibers |
| 6,049,317 | A | 4/2000 | Thompson et al. |
| 6,055,090 | A | 4/2000 | Miles |
| 6,056,406 | A | 5/2000 | Park et al. |
| 6,061,075 | A | 5/2000 | Nelson et al. |
| 6,097,145 | A | 8/2000 | Kastalsky et al. |
| 6,099,132 | A | 8/2000 | Kaeriyama |
| 6,100,872 | A | 8/2000 | Aratani et al. |
| 6,113,239 | A | 9/2000 | Sampsell et al. |
| 6,147,790 | A | 11/2000 | Meier et al. |
| 6,158,156 | A | 12/2000 | Patrick |
| 6,160,833 | A | 12/2000 | Floyd et al. |
| 6,171,945 | B1 | 1/2001 | Mandal et al. |
| 6,172,797 | B1 | 1/2001 | Huibers |
| 6,180,428 | B1 | 1/2001 | Peeters et al. |
| 6,195,196 | B1 | 2/2001 | Kimura et al. |
| 6,201,633 | B1 | 3/2001 | Peeters et al. |
| 6,215,221 | B1 | 4/2001 | Cabuz et al. |
| 6,232,936 | B1 | 5/2001 | Gove et al. |
| 6,239,777 | B1 | 5/2001 | Sugahara et al. |
| 6,243,149 | B1 | 6/2001 | Swanson et al. |
| 6,262,697 | B1 | 7/2001 | Stephenson |
| 6,282,010 | B1 | 8/2001 | Sulzbach et al. |
| 6,288,472 | B1 | 9/2001 | Cabuz et al. |
| 6,288,824 | B1 | 9/2001 | Kastalsky |
| 6,295,154 | B1 | 9/2001 | Laor et al. |
| 6,323,982 | B1 | 11/2001 | Hornbeck |
| 6,327,071 | B1 | 12/2001 | Kimura |
| 6,331,909 | B1 | 12/2001 | Dunfield |
| 6,335,831 | B2 | 1/2002 | Kowarz et al. |
| 6,356,254 | B1 | 3/2002 | Kimura |
| 6,356,378 | B1 | 3/2002 | Huibers |
| 6,358,021 | B1 | 3/2002 | Cabuz |
| 6,376,787 | B1 | 4/2002 | Martin et al. |
| 6,384,952 | B1 | 5/2002 | Clark et al. |
| 6,407,851 | B1 | 6/2002 | Islam et al. |
| 6,417,868 | B1 | 7/2002 | Bock et al. |
| 6,433,917 | B1 | 8/2002 | Mei et al. |
| 6,438,282 | B1 | 8/2002 | Takeda et al. |
| 6,447,126 | B1 | 9/2002 | Hornbeck |
| 6,449,084 | B1 | 9/2002 | Guo |
| 6,452,712 | B2 | 9/2002 | Atobe et al. |
| 6,456,420 | B1 | 9/2002 | Goodwin-Johansson |
| 6,465,355 | B1 | 10/2002 | Horsley |
| 6,466,190 | B1 | 10/2002 | Evoy |
| 6,466,354 | B1 | 10/2002 | Gudeman |
| 6,466,358 | B2 | 10/2002 | Tew |
| 6,473,072 | B1 | 10/2002 | Comiskey et al. |
| 6,473,274 | B1 | 10/2002 | Maimone et al. |
| 6,480,177 | B2 | 11/2002 | Doherty et al. |
| 6,496,122 | B2 | 12/2002 | Sampsell |
| 6,545,335 | B1 | 4/2003 | Chua et al. |
| 6,548,908 | B2 | 4/2003 | Chua et al. |
| 6,549,338 | B1 | 4/2003 | Wolverton et al. |
| 6,552,840 | B2 | 4/2003 | Knipe |
| 6,556,338 | B2 | 4/2003 | Han et al. |
| 6,574,033 | B1 | 6/2003 | Chui et al. |
| 6,589,625 | B1 | 7/2003 | Kothari et al. |
| 6,597,490 | B2 | 7/2003 | Tayebati |
| 6,600,201 | B2 | 7/2003 | Hartwell et al. |
| 6,606,175 | B1 | 8/2003 | Sampsell et al. |
| 6,608,268 | B1 | 8/2003 | Goldsmith |
| 6,624,944 | B1 | 9/2003 | Wallace et al. |
| 6,625,047 | B2 | 9/2003 | Coleman, Jr. |
| 6,630,786 | B2 | 10/2003 | Cummings et al. |
| 6,632,698 | B2 | 10/2003 | Ives |
| 6,635,919 | B1 | 10/2003 | Melendez et al. |
| 6,643,069 | B2 | 11/2003 | Dewald |
| 6,650,455 | B2 | 11/2003 | Miles |
| 6,657,832 | B2 | 12/2003 | Williams et al. |
| 6,660,656 | B2 | 12/2003 | Cheung et al. |
| 6,661,561 | B2 | 12/2003 | Fitzpatrick et al. |
| 6,666,561 | B1 | 12/2003 | Blakley |
| 6,674,033 | B1 | 1/2004 | Chui et al. |
| 6,674,090 | B1 | 1/2004 | Chua et al. |
| 6,674,562 | B1 | 1/2004 | Miles et al. |
| 6,680,792 | B2 | 1/2004 | Miles |
| 6,698,295 | B1 | 3/2004 | Sherrer |
| 6,710,908 | B2 | 3/2004 | Miles et al. |
| 6,741,377 | B2 | 5/2004 | Miles |
| 6,741,383 | B2 | 5/2004 | Huibers et al. |
| 6,741,384 | B1 | 5/2004 | Martin et al. |
| 6,741,503 | B1 | 5/2004 | Farris et al. |
| 6,747,785 | B2 | 6/2004 | Chen et al. |
| 6,747,800 | B1 | 6/2004 | Lin |
| 6,775,174 | B2 | 8/2004 | Huffman et al. |
| 6,778,155 | B2 | 8/2004 | Doherty et al. |
| 6,794,119 | B2 | 9/2004 | Miles |
| 6,809,788 | B2 | 10/2004 | Yamada et al. |
| 6,811,267 | B1 | 11/2004 | Allen et al. |
| 6,819,469 | B1 | 11/2004 | Koba |
| 6,822,628 | B2 | 11/2004 | Dunphy et al. |
| 6,829,132 | B2 | 12/2004 | Martin et al. |
| 6,841,081 | B2 | 1/2005 | Chang et al. |
| 6,844,959 | B2 | 1/2005 | Huibers et al. |

| | | |
|---|---|---|
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,870,654 B2 | 3/2005 | Lin et al. |
| 6,882,458 B2 | 4/2005 | Lin et al. |
| 6,882,461 B1 | 4/2005 | Tsai et al. |
| 6,891,658 B2 | 5/2005 | Whitehead et al. |
| 6,912,022 B2 | 6/2005 | Lin et al. |
| 6,940,630 B2 * | 9/2005 | Xie ............................ 359/290 |
| 6,947,200 B2 | 9/2005 | Huibers |
| 6,952,303 B2 | 10/2005 | Lin et al. |
| 6,958,817 B1 * | 10/2005 | Zhu et al. .................... 356/498 |
| 6,958,847 B2 | 10/2005 | Lin |
| 6,959,990 B2 | 11/2005 | Penn |
| 6,980,350 B2 | 12/2005 | Hung et al. |
| 7,008,812 B1 | 3/2006 | Carley |
| 7,053,737 B2 | 5/2006 | Schwartz et al. |
| 7,068,372 B1 * | 6/2006 | Trisnadi et al. ............. 356/450 |
| 7,075,700 B2 | 7/2006 | Muenter |
| 7,123,216 B1 | 10/2006 | Miles |
| 7,236,284 B2 | 6/2007 | Miles |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0014579 A1 | 2/2002 | Dunfield |
| 2002/0015215 A1 | 2/2002 | Miles |
| 2002/0021485 A1 | 2/2002 | Pilossof |
| 2002/0024711 A1 | 2/2002 | Miles |
| 2002/0027636 A1 | 3/2002 | Yamada |
| 2002/0054424 A1 | 5/2002 | Miles |
| 2002/0070931 A1 | 6/2002 | Ishikawa |
| 2002/0075555 A1 | 6/2002 | Miles |
| 2002/0114558 A1 | 8/2002 | Nemirovsky |
| 2002/0126364 A1 | 9/2002 | Miles |
| 2002/0139981 A1 | 10/2002 | Young |
| 2002/0146200 A1 | 10/2002 | Kudrle et al. |
| 2002/0149828 A1 | 10/2002 | Miles |
| 2002/0149850 A1 | 10/2002 | Heffner et al. |
| 2002/0167072 A1 | 11/2002 | Andosca |
| 2002/0167730 A1 | 11/2002 | Needham et al. |
| 2002/0186483 A1 | 12/2002 | Hagelin et al. |
| 2002/0186583 A1 | 12/2002 | Hagelin et al. |
| 2003/0015936 A1 | 1/2003 | Yoon et al. |
| 2003/0016428 A1 | 1/2003 | Kato et al. |
| 2003/0029705 A1 | 2/2003 | Qiu et al. |
| 2003/0035196 A1 | 2/2003 | Walker |
| 2003/0043157 A1 | 3/2003 | Miles |
| 2003/0053078 A1 | 3/2003 | Missey et al. |
| 2003/0072070 A1 | 4/2003 | Miles |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0210851 A1 | 11/2003 | Fu et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0056742 A1 | 3/2004 | Dabbaj |
| 2004/0058532 A1 | 3/2004 | Miles et al. |
| 2004/0075967 A1 | 4/2004 | Lynch et al. |
| 2004/0080035 A1 | 4/2004 | Delapierre |
| 2004/0080807 A1 | 4/2004 | Chen et al. |
| 2004/0100594 A1 | 5/2004 | Huibers et al. |
| 2004/0100677 A1 | 5/2004 | Huibers et al. |
| 2004/0100680 A1 | 5/2004 | Huibers et al. |
| 2004/0124483 A1 | 7/2004 | Partridge et al. |
| 2004/0125281 A1 | 7/2004 | Lin |
| 2004/0125282 A1 | 7/2004 | Lin et al. |
| 2004/0125347 A1 | 7/2004 | Patel et al. |
| 2004/0136045 A1 | 7/2004 | Tran |
| 2004/0140557 A1 | 7/2004 | Sun et al. |
| 2004/0145049 A1 | 7/2004 | McKinnell et al. |
| 2004/0145811 A1 | 7/2004 | Lin et al. |
| 2004/0147056 A1 | 7/2004 | McKinnell et al. |
| 2004/0147198 A1 | 7/2004 | Lin et al. |
| 2004/0148009 A1 | 7/2004 | Buzzard et al. |
| 2004/0150939 A1 | 8/2004 | Huff |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0179445 A1 | 9/2004 | Park et al. |
| 2004/0184766 A1 | 9/2004 | Kim et al. |
| 2004/0201908 A1 | 10/2004 | Kaneko |
| 2004/0207897 A1 | 10/2004 | Lin |
| 2004/0209192 A1 | 10/2004 | Lin et al. |
| 2004/0209195 A1 | 10/2004 | Lin |
| 2004/0212026 A1 | 10/2004 | Van Brocklin et al. |
| 2004/0217378 A1 | 11/2004 | Martin et al. |
| 2004/0217919 A1 | 11/2004 | Piehl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0233503 A1 | 11/2004 | Kimura |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0002082 A1 | 1/2005 | Miles |
| 2005/0003667 A1 | 1/2005 | Lin et al. |
| 2005/0014374 A1 | 1/2005 | Partridge et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0038950 A1 | 2/2005 | Adelmann |
| 2005/0042117 A1 | 2/2005 | Lin |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0069209 A1 | 3/2005 | Damera-Venkata et al. |
| 2005/0078348 A1 | 4/2005 | Lin |
| 2005/0157364 A1 | 7/2005 | Lin |
| 2005/0168849 A1 | 8/2005 | Lin |
| 2005/0195462 A1 | 9/2005 | Lin |
| 2005/0195467 A1 | 9/2005 | Kothari et al. |
| 2005/0202649 A1 | 9/2005 | Hung et al. |
| 2005/0249966 A1 | 11/2005 | Tung et al. |
| 2006/0007517 A1 | 1/2006 | Tsai |
| 2006/0044654 A1 | 3/2006 | Vandorpe et al. |
| 2006/0065940 A1 | 3/2006 | Kothari et al. |
| 2006/0066599 A1 | 3/2006 | Chui et al. |
| 2006/0066640 A1 | 3/2006 | Kothari et al. |
| 2006/0066935 A1 | 3/2006 | Cummings et al. |
| 2006/0067643 A1 | 3/2006 | Kothari et al. |
| 2006/0077155 A1 | 4/2006 | Chui et al. |
| 2006/0077507 A1 | 4/2006 | Chui et al. |
| 2006/0077508 A1 | 4/2006 | Chui et al. |
| 2006/0077515 A1 | 4/2006 | Cummings et al. |
| 2006/0077516 A1 | 4/2006 | Kothari |
| 2006/0077533 A1 | 4/2006 | Miles et al. |
| 2006/0079048 A1 | 4/2006 | Sampsell |
| 2006/0139723 A9 | 6/2006 | Miles |

| | | | |
|---|---|---|---|
| 2006/0220160 A1 | 10/2006 | Miles |
| 2006/0262126 A1 | 11/2006 | Miles |
| 2006/0262380 A1 | 11/2006 | Miles |
| 2006/0268388 A1 | 11/2006 | Miles |
| 2006/0274074 A1 | 12/2006 | Miles |
| 2007/0177247 A1 | 8/2007 | Miles |
| 2008/0037093 A1 | 2/2008 | Miles |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0106782 A1 | 5/2008 | Miles |

FOREIGN PATENT DOCUMENTS

| | | |
|---|---|---|
| DE | 4108966 A1 | 9/1992 |
| DE | 10228946 A1 | 1/2004 |
| EP | 0 310 176 A2 | 4/1989 |
| EP | 0 361 981 | 4/1990 |
| EP | 0 667 548 A1 | 8/1995 |
| EP | 0 788 005 | 8/1997 |
| EP | 1 122 577 | 8/2001 |
| EP | 1275997 | 1/2003 |
| EP | 1 435 336 | 7/2004 |
| EP | 1 473 691 A | 11/2004 |
| EP | 1473581 A2 | 11/2004 |
| EP | 1484635 | 12/2004 |
| FR | 2 824 643 A | 11/2002 |
| JP | 62 082454 | 4/1987 |
| JP | 05275401 A1 | 10/1993 |
| JP | 9-127439 | 5/1997 |
| JP | 11211999 | 8/1999 |
| JP | 11211999 A | 11/1999 |
| JP | 2000306515 A | 11/2000 |
| JP | 2001-221913 | 8/2001 |
| JP | 2002-062490 | 2/2002 |
| JP | 2002-221678 | 8/2002 |
| JP | 2002277771 A | 9/2002 |
| JP | 2003-340795 | 2/2003 |
| JP | 2003195201 A | 7/2003 |
| JP | 2004157527 A | 6/2004 |
| JP | 2004-212638 | 7/2004 |
| JP | 2004-212680 | 7/2004 |
| JP | 2004235465 A | 8/2004 |
| JP | 2004-286825 A | 10/2004 |
| WO | WO9530924 | 11/1995 |
| WO | WO9717628 | 5/1997 |
| WO | WO9952006 A2 | 10/1999 |
| WO | WO9952006 A3 | 10/1999 |
| WO | WO 02/079853 | 10/2002 |
| WO | WO03007049 A1 | 1/2003 |
| WO | WO 03/014789 A2 | 2/2003 |
| WO | WO 03/054925 | 7/2003 |
| WO | WO 03/054925 A | 7/2003 |
| WO | WO 03/069404 | 8/2003 |
| WO | WO 03/069413 A | 8/2003 |
| WO | WO03069413 A1 | 8/2003 |
| WO | WO03073151 A1 | 9/2003 |
| WO | WO 03/085728 A1 | 10/2003 |
| WO | WO2004006003 A1 | 1/2004 |
| WO | WO2004026757 A2 | 4/2004 |
| WO | WO 2005/006364 A1 | 1/2005 |
| WO | WO 2006/014929 | 2/2006 |

OTHER PUBLICATIONS

Fork, et al., "P-67: Chip on Glass Bonding using StressedMetal™ Technology" Sid 05 Digest, May 24, 2005.
Kim et al., "Control of Optical Transmission Through metals Perforated With Subwave-Length Hole Arrays," Optic Letters, vol. 24, No. 4, Feb. 15, 1999, pp. 256-257.
Lin et al., "Free-Space Michromachined Optical Switches for Optical Networking," IEEE Journal of Selected Topics in Quantum Electronics, vol. 5, No. 1m Jan./Feb. 1999, pp. 4-9.
Little et al., "Vertically Coupled Microring Resonator Channel Dropping Filter," IEEE Photonics Technology Letters, vol. 11, No. 2, 1999.
Magel, "Integrated Optic Devices Using Micromachined Metal Membranes," SPIE vol. 2686, 0-8194-2060-3/1996.
Science and Technology, The Economist, May 22, 1999, pp. 89-90.
Butler et al., "An Embedded Overlay Concept for Microsystems Packaging," IEEE Transactions on Advanced Packaging IEEE USA, vol. 23, No. 4, pp. 617-622, XP002379648 (2000).
Chiou et al., "A Novel Capacitance Control Design of Tunable Capacitor Using Multiple Electrostatic Driving Electrodes," IEEE Nano 2001, M 3.1, Nanoelectronics and Giga-Scale Systems (Special Session), Oct. 29, 2001, pp. 319-324.
Chunjun Wang et al., "Flexible curcuit-based RF MEMS Switches," MEMS. XP002379649 pp. 757-762, (Nov. 2001).
Goossen, "MEMS-based variable optical interference devices," Optical MEMS, 2000 IEEE/LEDS Int'l. Conf. on Aug. 21-24, 2000, Piscatawny, NJ, Aug. 21, 2000, pp. 17-18.
Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. Conf 6, Jun. 24, 1991, pp. 372-375.
Joannopoulos et al., "Molding the Flow of Light," Photonic Crystals. 1995.
Nagami et al., "Plastic Cell Architecture: Towards Reconfigurable Computing for General-Purpose," Proc. IEEE Workshop on FPGA-based Custom Computing Machines, (1998).
Wu et al., "MEMS Designed for Tunable Capacitors," Microwave Symposium Digest, 1998 IEEE MTT-S Int'l., Baltimore, MD, Jun. 7-12, 1998, vol. 1, pp. 127-129.
Zhou et al., "Waveguide Panel Display Using Electromechanical Spatial Modulators," SID Digest, vol. XXIX, 1998.
International Search Report and Written Opinion of the International Searching Authority for PCT/US2005/005919 dated Aug. 24, 2005.
International Search Report Application No. PCT/US2005/026448, Dated Nov. 23, 2005.
International Search Report Application No. PCT/US2005/029820, Dated Dec. 27, 2005.
International Search Report Application No. PCT/US2005/030962, Dated Aug. 31, 2005.
International Search Report Application No. PCT/US2005/034465, Dated Sep. 23, 2005.
Austrian Search Report No. 162/2005, Dated Jul. 14, 2005.
Austrian Search Report No. 140/2005, Dated Jul. 15, 2005.
Austrian Search Report No. 161/2005, Dated Jul. 15, 2005.
Austrian Search Report No. 150/2005, Dated Jul. 29, 2005.
Austrian Search Report No. 144/2005, Dated Aug. 11, 2005.
Austrian Search Report No. 66/2005, Dated May 9, 2005.
Peerlings, J. et al., "Long Resonator Micromachined Tunable Gaas-Alas Fabry-Perot Filter," IEEE Photonics Tech. Letters, IEEE Service Center, Piscataway, NJ, vol. 9, No. 9, pp. 1235-1237 (Sep. 1997).
Wu, H.D. et al., "MEMS designed for tunable capacitors," Microwave Symposium Digest, 1998 IEEE MTT-S International Baltimore, MD, vol. 1, pp. 127-129 (Jun. 1998).
Search Report in European Patent Application No. EP 05 25 5673 in 9 pages, dated Jan. 23, 2006.
Akasaka, "Three-Dimensional IC Trends", Proceedings of IEEE, vol. 74, No. 12, pp. 1703-1714, (Dec. 1986).
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani K., et al., "Surface micromachined tuneable interferometer array," Sensors and Actuators, pp. 17-23. (1994).
Bass, "Handbook of Optics, Vol. I, Fundamentals, Techniques, and Design, Second Edition," McGraw-Hill, Inc., New York, pp. 2.29-2.36 (1995).
Conner, "Hybrid Color Display Using Optical Interference Filter Array," SID Digest, pp. 577-580 (1993).
Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstructure Science, vol. 5, pp. 145-153 and pp. 166-173 (1982).

Ibbotson et al., "Comparison of XeF2 and F-atom reactions with Si and SiO2," Applied Physics Letters, vol. 44, No. 12, pp. 1129-1131 (Jun. 1984).

Jackson "Classical Electrodynamics", John Wiley & Sons Inc., pp. 568-573. (date unknown).

Jerman et al., "A Miniature Fabry-Perot Interferometer with a Corrugated Silicon Diaphragm Support", (1988).

Johnson "Optical Scanners", Microwave Scanning Antennas, vol. 1, p. 251-261, (1964).

Light over Matter, Circle No. 36 (Jun. 1993).

Miles, Mark, W., "A New Reflective FPD Technology Using Interferometric Modulation", The Proceedings of the Society for Information Display (May 11-16, 1997).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1966).

Raley et al., "A Fabry-Perot Microinterferometer for Visible Wavelengths", IEEE Solid-State Sensor and Actuator Workshop, Jun. 1992, Hilton Head, SC.

Schankenberg, et al. TMAHW Etchants for Silicon Micromachining. 1991 International Conference on Solid State Sensors and Actuators-Digest of Technical Papers. pp. 815-818.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill, pp. 340-343, (1963).

Walker, et al., "Electron-beam-tunable Interference Filter Spatial Light Modulator", Optics Letters vol. 13, No. 5, pp. 345-347, (May 1988).

Williams, et al. Etch Rates for Micromachining Processing. Journal of Microelectromechanical Systems, vol. 5, No. 4, pp. 256-259, (Dec. 1996).

Winters, et al. The etching of silicon with XeF2 vapor. Applied Physics Letters, vol. 34, No. 1, pp. 70-73, (Jan. 1979).

Winton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Austrian Patent Office Search Report dated Jul. 4, 2005.

Office Action dated May 9, 2008 in Chinese App. No. 200510105036.7.

Official Communication for European Patent Application No. 05255673.5, mailed Feb. 20, 2008.

Pape et al., Characteristics of the deformable mirror device for optical information processing, Optical Engineering, 22(6):676-681, Nov.-Dec. 1983.

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

* cited by examiner

DEVICE AND METHOD FOR MANIPULATION OF THERMAL RESPONSE IN A MODULATOR

CROSS-REFERENCE TO RELATED APPLICATIONS

This application claims the priority benefit under 35 U.S.C. §119(e) of U.S. Provisional Application No. 60/613,552, filed Sep. 27, 2004.

BACKGROUND

1. Field of the Invention

This invention relates to microelectromechanical systems (MEMS) and, more particularly, to devices and methods for selectively creating constructive and/or destructive interference of light waves.

2. Description of the Related Technology

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or in part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

In one aspect, the invention provides an interferometric light modulating device. The interferometric light modulating device includes a partially-reflective part, a thermally-responsive movable part and a heat source. The thermally-responsive movable part moves relative to the partially-reflective part in response to changes of temperature. The heat source is configured to heat the movable part to vary a distance between the partially-reflective part and the movable part. In another aspect of the invention the interferometric light modulating device further includes a display, a processor that is in electrical communication with the display and that is configured to process image data, and a memory device in electrical communication with the processor.

In yet another aspect, the invention provides a display device having a plurality of micromechanical display elements. Each display element includes a transmissive layer, a reflective layer and a heating element. The reflective layer is parallel to and supported spaced from the transmissive layer by a thermally responsive material. The heating element is in thermal communication with the thermally responsive material.

In another aspect, the invention provides a method for modulating electromagnetic radiation. The method includes providing a micromechanical device, which includes a thermally responsive part, a temperature modulator, a first partially reflective surface and a second surface spaced from and generally parallel to the first surface. The thermally responsive part moves in response to changes of temperature. The method further includes adjusting the temperature modulator to change a temperature of the thermally responsive part, thereby varying the distance between the first and second surfaces.

In yet another aspect, the invention provides a method for producing a micromechanical device. The method includes forming a first reflective layer, forming a second reflective layer spaced from the first reflective layer and forming a heating element in thermal communication with the second reflective layer. In another aspect, the invention provides an interferometric modulator formed by this method.

In yet another aspect, the invention provides an interferometric modulator. The interferometric modulator includes a transmissive layer, a reflective layer and a means for actuating movement of the reflective layer using thermal energy.

DETAILED DESCRIPTION OF PREFERRED EMBODIMENTS

Figure 1:
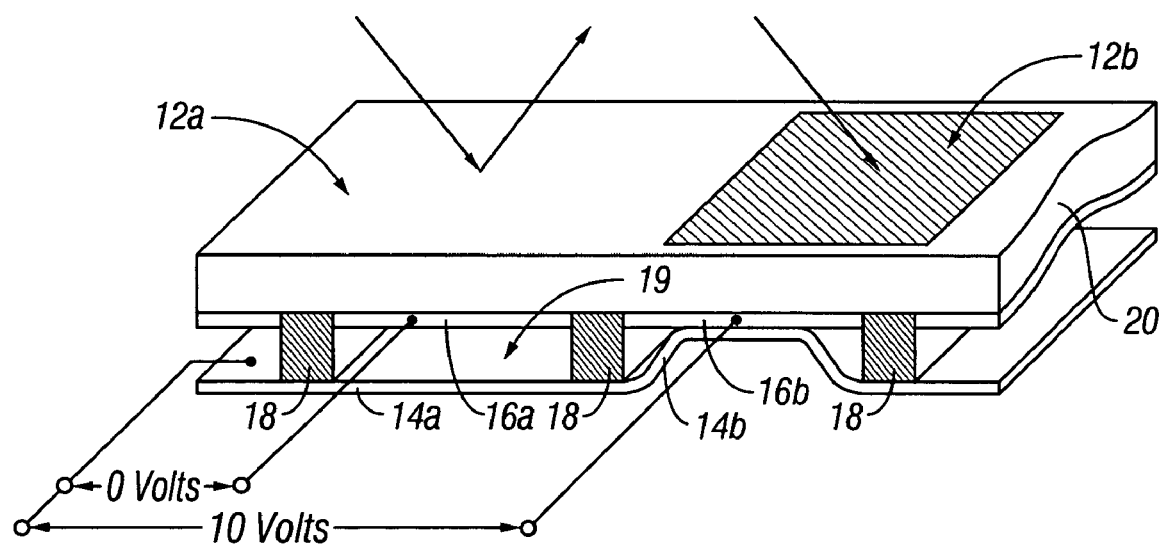
FIG. 1 is an isometric view illustrating a portion of an interferometric modulator display having interferometric modulators in which electrostatic attraction moves a movable layer relative to a fixed layer.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

As described below in greater detail, the perception of light absorption or reflectance from an interferometric modulator is typically changed by altering the electrostatic attraction between a pair of conductive plates. The electrostatic attraction is caused by voltage running through the plates. It will be appreciated that the two possible states for such a modulator are: 1) the lack of an electrostatic attraction or 2) the presence of an electrostatic attraction. In the first state, the spacing between the two plates is determined by the position of the plates when relaxed. In the second state, the plates typically come together until they contact or until one of the plates hits a physical stop. By alternating between these two states, interferometric modulators typically work in a binary or digital fashion, either creating, at a given frequency, destructive or contructive interference, or not creating such interference. Because the plates in these interferometric modulators alternate between two distances relative to one another, it will be appreciated that the particular frequencies of destructive or constructive interference with the plates in a certain state is typically determined based upon these relative distances.

In preferred embodiments of the invention, movement of a reflective layer relative to a transmissive layer is actuated by heat energy. The transmissive layer is partially reflective and also allows light to be transmitted to the reflective layer. Preferably, the material forming one or both of the layers, or a material supporting one or both of the layers, includes a thermally responsive material that can contract, expand or otherwise change shape as a function of temperature. In some preferred embodiments, the transmissive layer preferably remains stationary while the reflective layer is movable relative to the transmissive layer. Heat energy actuates a shape change in the thermally responsive material, which causes the reflective layer to move. By regulating the temperature of the thermally responsive material, the amount that the shape of the material changes can preferably be regulated, thereby allowing the spacing between the transmissive and reflective layers to be changed as desired. Thus, by varying the heat energy applied to the thermally responsive material, analog-like control of the frequencies of destructive/constructive interference can be achieved.

The temperature of the thermally responsive material is regulated by the application of heat energy, preferably transferred conductively from a heating element, e.g., a resistive heater, that is preferably in contact with the material. It will be appreciated that other forms of heat transfer, e.g., radiative heat transfer from an infrared light source, to the thermally responsive material are also possible. In some embodiments, heat energy can be transferred to the thermally responsive material via various intervening conduits. For example, the heating element can be used to absorb heat energy, e.g., from an infrared light source, and then transfer the heat energy to the thermally responsive material.

An embodiment of an interferometric modulator display with an interferometric MEMS display element having transmissive and reflective layers, which are controlled by electrostatic attraction, are illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a relaxed position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers 14a, 14b are separated from the fixed metal layers by a defined gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
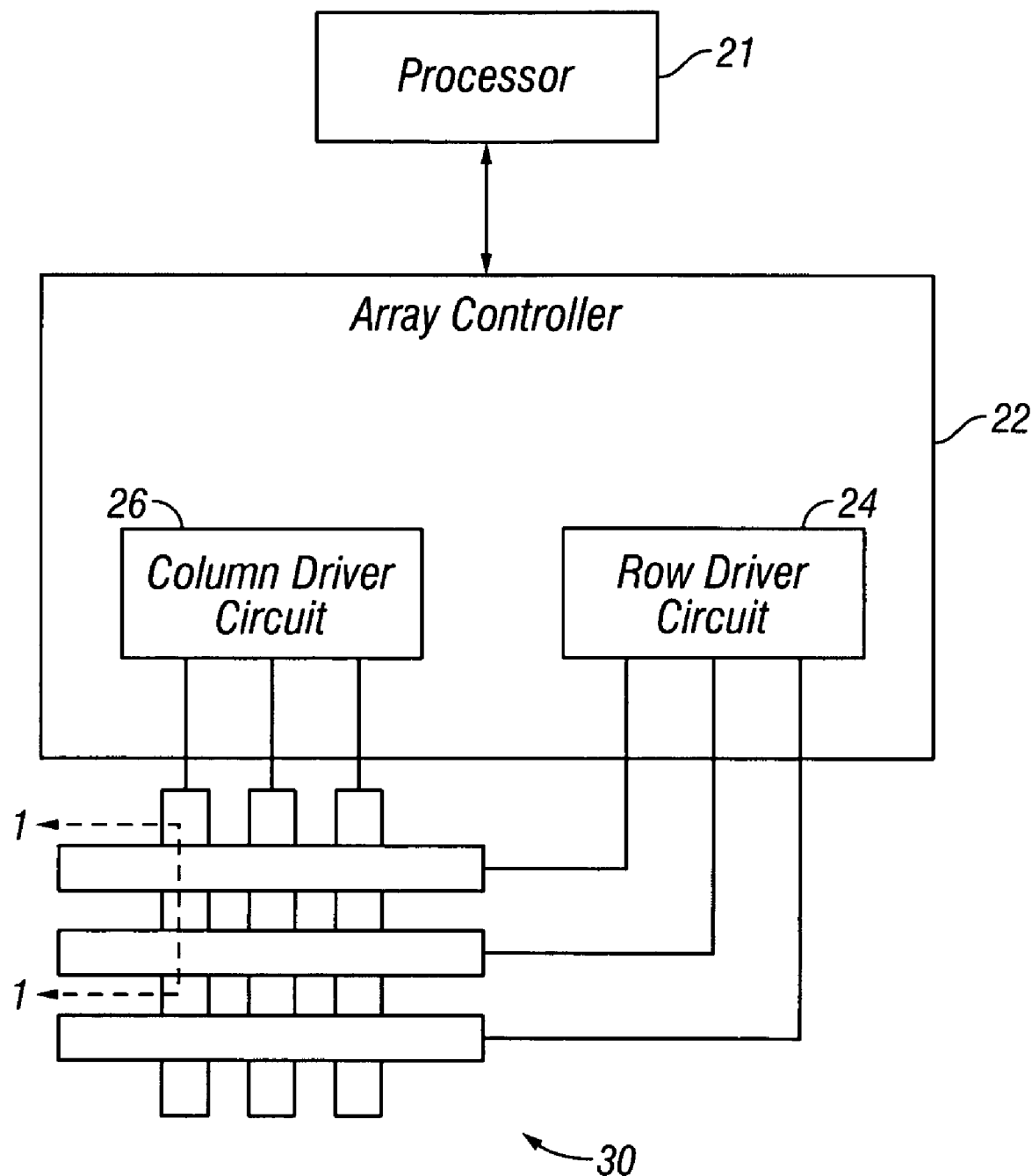
FIG. 2 is a system block diagram illustrating an electronic device incorporating a 3×3 interferometric modulator display, formed using the interferometric modulators of FIG. 1.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a display array or panel 30. The cross section of the array illustrated in FIG. 1 is shown by the lines 1-1 in FIG. 2. For some MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with displays utilizing interferometric modulators.

Figures 3, 4:
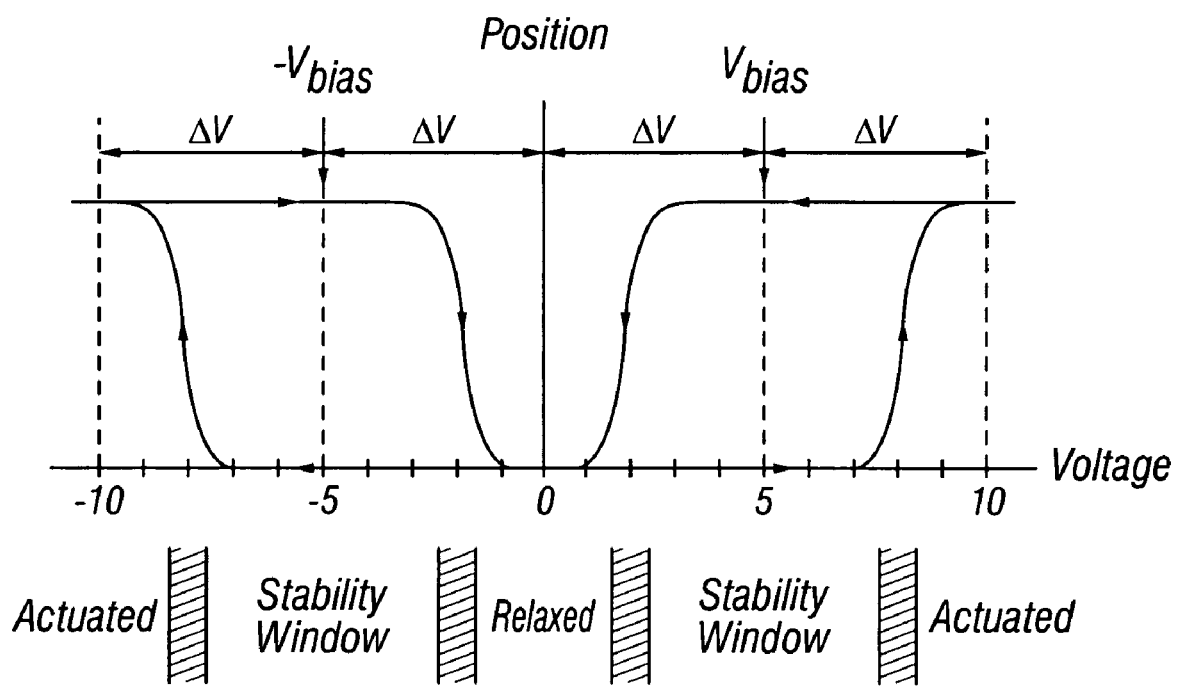
FIG. 3 is a graph depicting movable mirror position versus applied voltage for the interferometric modulators of FIG. 1.
FIG. 4 illustrates an example of a set of row and column voltages that may be used to drive the interferometric modulator display of FIG. 2.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the embodiment illustrated in FIG. 4, actuating a pixel involves setting the appropriate column to $-V_{bias}$, and the appropriate row to $+\Delta V$, which may correspond to $-5$ volts and $+5$ volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
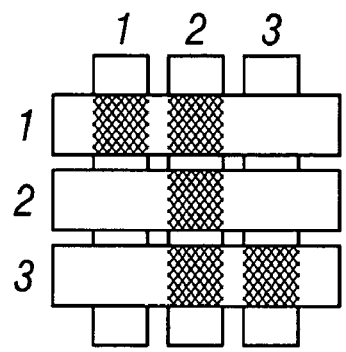
FIGS. 5A and 5B illustrate a timing diagram showing row and column signals that may be used to write a frame of display data to the interferometric modulator display of FIG. 2.
Figure 5B:
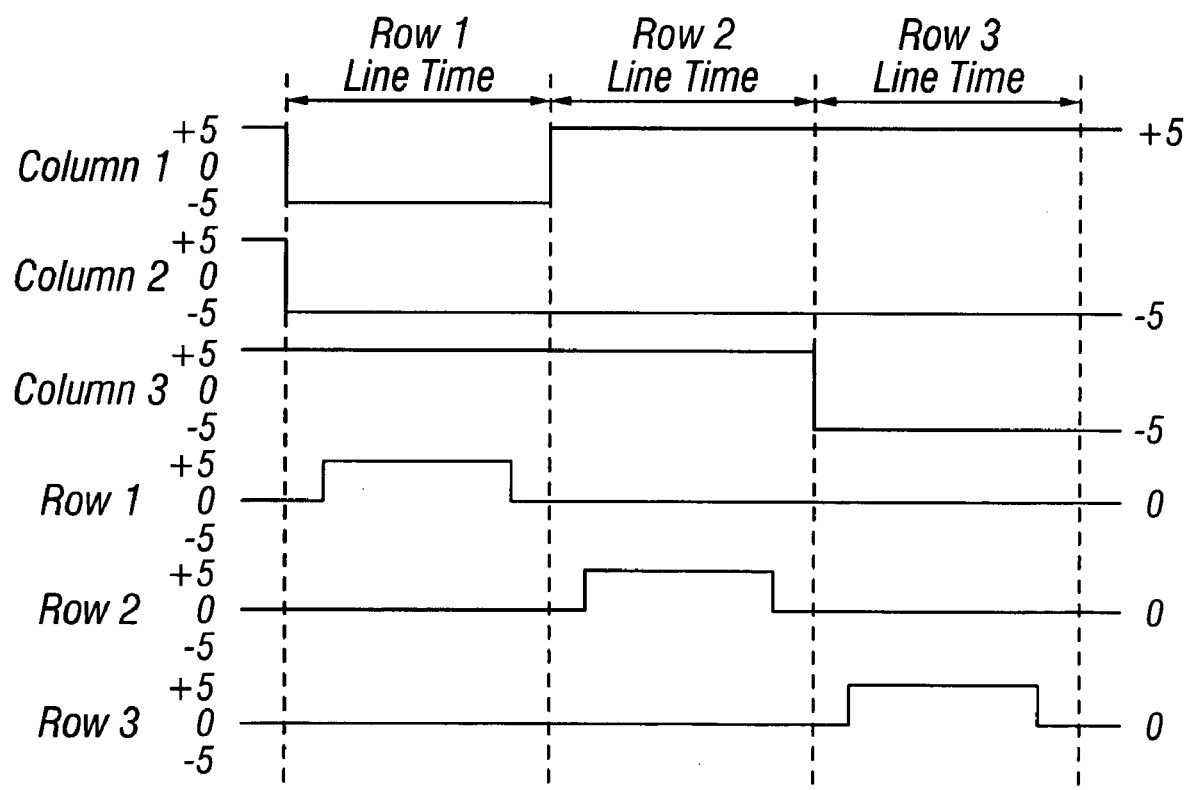

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with systems employing electrostatic attraction to move a movable layer in an interferometric modulator.

As noted above, a movable, or reflective, layer in some interferometric modulators are actuated by creating electrostatic attraction between that layer and a fixed, or transmissive, layer. This switches the interferometric modulator between two states, typically dark or bright. In preferred embodiments, heat energy is applied to actuate movement of the movable layer. Advantageously, the heat energy can be used to switch the interferometric modulator between dark or bright states, or the interferometric modulator can be configured to reflect predominantly at selected light frequencies, allowing for a color to be displayed, in addition to black and white. The color can be selected by varying the distance between the reflective and transmissive layers of the interferometric modulator, thereby changing the light frequencies in which constructive and/or destructive interference occurs.

Figure 6:
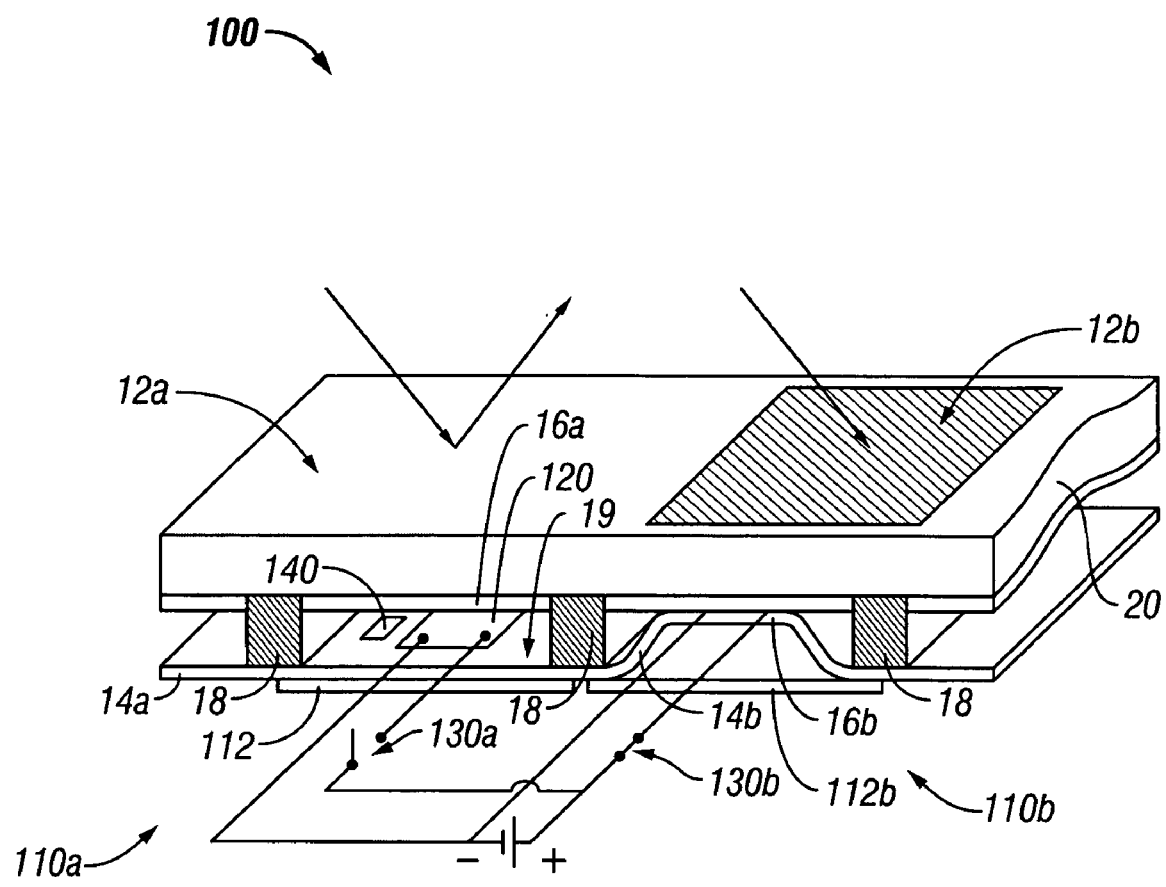
FIG. 6 is an isometric view illustrating a portion of an interferometric modulator display having interferometric modulators configured for actuation using heat energy, in accordance with preferred embodiments of the invention.

With reference to FIG. 6, a portion of a visual display 100 is shown with two adjacent interferometric modulators 110a, 110b. The interferometric modulators 110a, 110b each form a pixel in the illustrated display 100 and each includes a fixed, or transmissive, layer 16a, 16b and a movable, or reflective, layer 14a, 14b. The interferometric modulator 110a on the left of the figure is shown in a relaxed position and the interferometric modulator 110b on the right of the figure is shown in an actuated position. Preferably, as noted above, the layer 16a, 16b is partially reflective and the layer 14a, 14b is highly reflective.

It will be appreciated that the movable layer 14a, 14b is preferably made to bend in one direction by the bend guides 112a, 112b, which preferably prevent movement in a direction away from the fixed layers 16a, 16b. The guides 112a, 112b can be any structure that can serve as a mechanical stop for the movement of the layer 14a, 14b. For example, the guides 112a, 112b can be a layer of a relatively inflexible material.

It will be appreciated that the movable layer 14a, 14b can be biased to move in a particular direction by various other means. For example, the movable layer 14a, 14b can be formed with a slight bow in the desired direction of movement (e.g., bowed inward into the gap 19 in the illustrated embodiment). In another example, the movable layer 14a, 14b can be formed with one or more materials which change shape or expand in a predefined manner in reaction to temperature change, as discussed further below.

With continued reference to FIG. 6, in the illustrated embodiment, the movable layer 14a, 14b is formed of a thermally responsive material that allows the movable layer 14a, 14b to move, when actuated by heat, between a first and second position. Non-limiting examples of suitable thermally responsive materials for the movable layer 14a, 14b include nickel, aluminum, nickel alloys, aluminum alloys, nickel-aluminum alloys, gold, platinum, rhodium, copper, silver and shape memory materials, including metals such as nitinol (nickel titanium). Shape memory materials can be particularly advantageous, especially for interferometric modulators 110a, 110b which alternative between light or dark states. Such material allow for large, relatively abrupt changes in the dimensions of the material with relatively small changes in temperature. For more continuous control over the dimensions of a material and, thus, finer control over the position of the movable layers 14a, 14b, the thermally responsive material preferably has dimensions that change predictably and relatively continuously with temperature. Advantageously, metals such as nickel, aluminum, nickel alloys, aluminum alloys, gold, platinum, rhodium, copper, and silver are suitable for this purpose, as their degree of expansion is substantially linear as a function of temperature over the temperature range compatible with human use of the interferometric modulators 110a, 110b. In addition, the thermally responsive material is preferably highly reflective of all desired frequencies of radiation (e.g., light at optical wavelengths), to simplify fabrication and allow its use for the reflective surface of the layer 14a, 14b. In other embodiments, another layer, which is highly reflective and can be formed of the same or a different material than the layer 14a, 14b, can be overlayed or otherwise attached to the layer 14a, 14b to achieve a desired degree of reflectivity. This additional mirror surface can be particularly desirable where the thermally responsive material is not highly reflective.

It will be appreciated that the movable layer 14a, 14b can be formed of more than one layer of material. For example, the movable layer 14a can be formed of a bimetallic sandwich formed of layers of two different metals, which preferably have different thermal expansion coefficients. Examples of combinations of metals for the two layers include nickel or copper for one layer and iron or titanium for the second layer. Preferably, the material that expands more in response to heat is positioned facing the fixed layer 16a, 16b while the second layer, formed of the other material, is positioned behind the more expansive layer. As the more expansive layer expands, the stress caused by this expansion and the relative lack of expansion of the second layer causes the sandwich to bend outwards toward the fixed layer 16a, 16b. Advantageously, because a bimetallic sandwich tends to bend in a predefined direction when heated, the interferometric modulators 110a, 110b can be formed without guides 112a, 112b.

With continued reference to FIG. 6, each interferometric modulator 110a, 110b is preferably provided with its own heating element 120. The heating element 120 provides heat to a selected layer 14a, 14b to switch a selected interferometric modulator 110a, 110b from a relaxed to an actuated state. In the illustrated embodiment, the heating element 120 is a resistive heater which generates heat as a result of electrical resistance to current flowing through the heater. The resistive heater can comprise, e.g., wires formed of, e.g., indium tin oxide (ITO) or any other material suitable for resistive heating. Preferably, where the heating element generates heat using current flow, e.g., using the wires, and where the layer 14a, 14b are conductive, the wires or the heating element itself is electrical insulated from the layer 14a, 14b. For example, the wires may be embedded in a dielectric material (e.g., various oxides) or the dielectric material can be formed in a layer between the heating element 120 and the layer 14a, 14b. Preferably, the insulating material is both electrically insulating and highly thermally conductive.

With continued reference to FIG. 6, the flow of current and, thus, the generation of heat is controlled by switches 130a, 130*b* disposed in the electrical connection between the heating elements 120 and a current source. A layer 14*a*, 14*b* is actuated by closing one of the switches 130*a*, 130*b*. The heating element of the interferometric modulator 110*b* is connected to a closed switch 130*b*, which causes current flow to the heating element (not shown) in the interferometric modulator 110*b*, thereby generate heating and causing the layer 14*b* to move and, thus, placing the interferometric modulator 110*b* into an actuated state. To effectively heat the layers 14*a*, 14*b*, the heat generated by the heating element 120 is preferably selected to exceed the heat dissipated by the layer 14*a*. Heat may be dissipated by, for example, thermal conduction to adjacent interferometric modulators 110*a*, 110*b*, thermal convection from the front and back sides of the layers 14*a*, 14*b*, as well as radiant losses.

It will be appreciated that any switching device compatible with the display 100 can be used as the switches 130*a*, 130*b*. For example, the switches 130*a*, 130*b* can be mechanical switches in which a conductive part moves to contact a conductive element to make an electrical connection. In other embodiments, the switches can be transistors.

Advantageously, having a switch associated with each layer 14*a*, 14*b* allows the interferometric modulators 110*a*, 110*b* to be individually controlled, when connected to the appropriate ancillary control systems. For example, the interferometric modulators 110*a*, 110*b* can be controlled and implemented in a display in a fashion similar to that of active matrix liquid crystal displays. As known in the art, individual control of the pixels advantageously allows for the formation of high-quality images by reducing crosstalk between pixels.

In other embodiments, the interferometric modulators 110*a*, 110*b* can be grouped and actuated as a group. For example, the interferometric modulators 110*a*, 110*b* can be grouped in rows or columns and configured to be actuated in unison. Such interferometric modulators 110*a*, 110*b* can each have a switch 130*a*, 130*b* and a controller configured to simultaneously place the modulators 110*a*, 110*b* in the same state. More preferably, the heating elements 120 of the group of interferometric modulators 110*a*, 110*b* are electrically connected together, e.g., in series or in parallel, and the entire group is then connected to a single switch.

As noted above, the movable layers 14*a*, 14*b* can be moved in a binary fashion or the degree of movement can be controlled by a measured application of heat. In some cases, a binary mode of operation may be desirable, as fine regulation of the amount of heat applied to the heating elements 120 is not necessary. Because the fixed layers 16*a*, 16*b* act as mechanical stops, the application of excess heat does not affect the position of the layers 14*a*, 14*b*, since they are stopped from moving beyond a particular point.

In other embodiments, the temperature of the layers 14*a*, 14*b* can be more closely regulated to permit finer control over the positions of those layers. Preferably, in such cases, the current flowing to the switches 130*a*, 130*b* is varied, as desired, synchronously with the switching of the switches 130*a*, 130*b*, thereby changing the temperature of the heating elements 120 as desired. It will be appreciated that the temperature of the layers 14*a*, 14*b* can be regulated using temperature sensors 140 in the interferometric modulators 110*a*, 110*b* and, more preferably, directly in each of the layers 14*a*, 14*b*. In other embodiments, the amount of current applied to the heaters 120 can be calibrated, e.g., through experimentation, to generate desired temperatures. For example, three or more temperatures can be realized by flowing current at one of three or more different levels to the heating elements 120. As noted above, the degree of movement can be selected based upon a desired spacing between the layers 14*a*, 14*b* and 16*a*, 16*b*, which spacing can, in turn, be selected based upon the spacing necessary to give a desired color.

It will be appreciated that the interferometric modulators 110*a*, 110*b* can be manufactured as described above with respect to FIG. 1, with a heater element 120 formed in thermal communication with the layers 14*a*, 14*b*. In other embodiments, the various parts 14*a*, 14*b*, 16*a*, 16*b* and 120 may be pre-fabricated and forming these parts simply involves providing the parts and then assembling the parts to manufacture the interferometric modulators 110*a*, 110*b*.

Figure 7A:
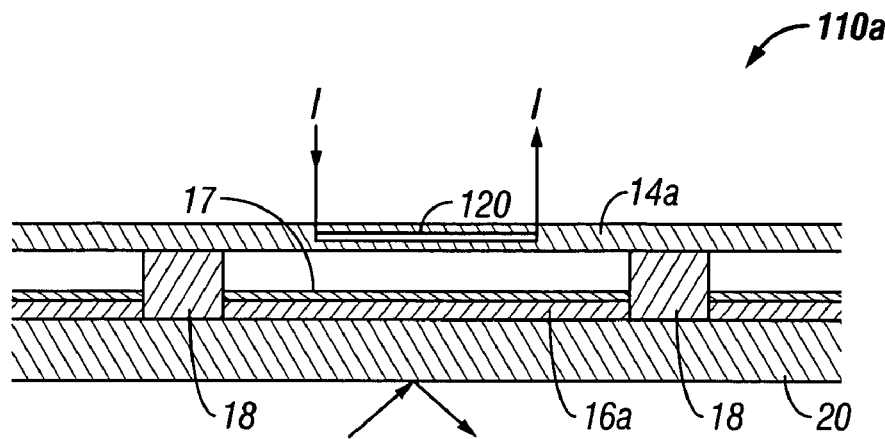
FIGS. 7A and 7C illustrate various heating element configurations for the interferometric modulators of FIG. 6, in accordance with preferred embodiments of the invention.
Figure 7B:
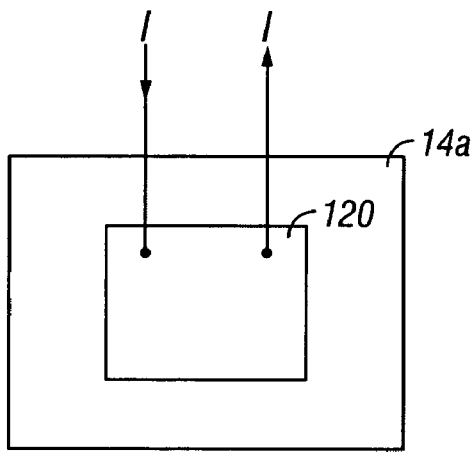
Figure 7C:
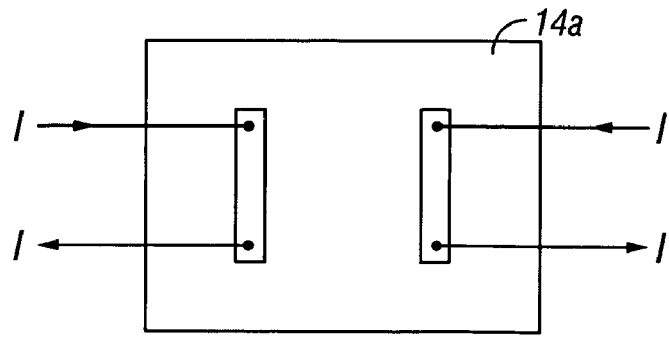

With reference to FIGS. 7A-7C, the heating elements are preferably positioned so as to evenly heat the thermally responsive material in the movable layer to encourage to move up and down uniformly. FIG. 7A is a cross-sectional side view of the interferometric modulator 110*a* of FIG. 1, where a strip of metal material 14*a* is deposited on orthogonally extending supports 18. FIGS. 7B and 7C are top-down views (top-down relative to the orientation of the interferometric modulator 110*a* in FIG. 7A) showing the position of the heating elements 120 in various exemplary embodiments. Preferably, as shown in FIG. 7B, the heating element 120 is centrally located in the movable layer 14*a*, to establish a symmetric temperature gradient relative to the center of the layer 14*a*.

In other embodiments, as shown in FIG. 7C, the heating element 120 can include multiple regions that are positioned at more focused locations to better localize heat energy at the parts of the layer 14*a* in which a change in material shape or dimension is desired. It will be appreciated that these various parts can be connected together and controlled as a single entity or can be independently controlled. Advantageously, where the heating element 120 is a resistive heater formed by wiring, the layer 14*a* can be formed with a variable wiring density to focus the application of heat to particular areas. For example, the wiring density can be higher in areas where more heat energy is desired.

It will be appreciated that the time required to change the temperature of the movable layer 14*a*, whether by heating or cooling, affects the refresh rate of a display using that layer. For example, an increase in the reaction time of the movable layer 14*a* to a change in temperature allows the display to refresh in less time. Alternatively, the movable layer 14*a* may be optimized to heat or cool more quickly to give a faster refresh rate. A faster refresh rate can provide a less noticeable transition between subsequent frames in a video display.

In some cases, the materials for the movable layer 14*a* and various parts in contact with that layer can be chosen to give a desired heating and cooling characteristic and, thus, influence the refresh rate. For example, the movable layer 14*a* and/or various parts in contact with that layer can formed of materials with a high coefficient of heat to increase the rate that heat is conducted away from the movable layer 14*a*, thus, increasing the cooling rate. Alternatively, the movable layer 14*a* and/or various parts in contact with that layer can formed of materials with a low coefficient of heat to decrease the rate that heat is conducted away from the movable layer 14*a*, thus, decreasing the cooling rate.

It will be appreciated that the layer 14*a* will revert to the relaxed state once it is allowed to cool, e.g., by stopping the flow of current to the heating element 120. The movement of the movable layer 14*a* back to its relaxed state is a function of the rate at which heat is dissipated from it. Advantageously, the small thermal mass of the layer 14*a* allows it to cool quickly. In other embodiments, the cooling rate can be increased by, e.g., using heat sinks or active cooling systems, to increase the refresh rate.

To minimize cooling of the movable layer 14a when cooling is not desired, that layer can be thermally isolated from surrounding structures. For example, the interferometric modulator 110a is preferably provided with a stop layer 17, which both appropriately spaces the layer 14a from the layer 16a at a desired distance in the actuated state and which also preferably is a thermal insulator that minimizes heat lost when the layer 14a is actuated and contacts the layer 17.

Figure 8A:
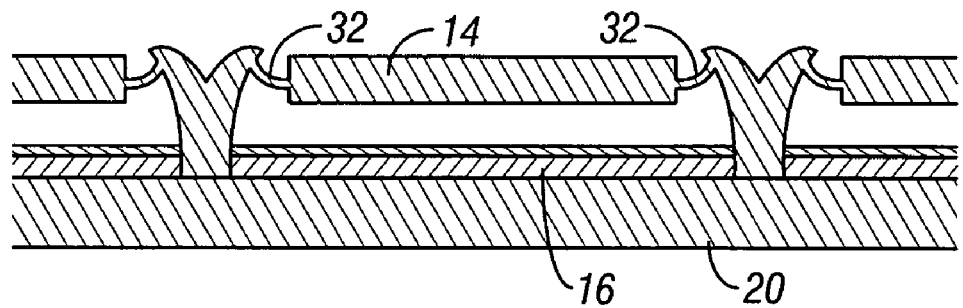
FIGS. 8A and 8B are cross-sectional side views showing, in greater detail, interferometric modulators of FIG. 1, in accordance with various preferred embodiments of the invention.
Figure 8B:
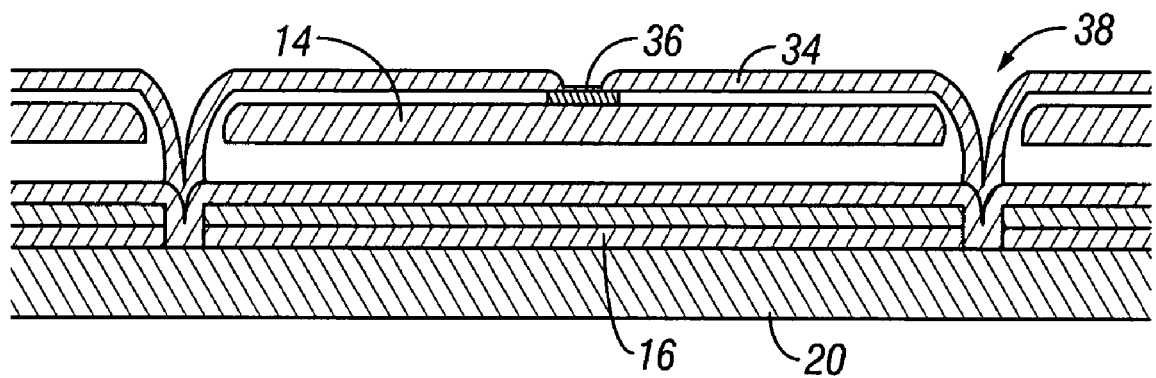

The details of the structure of interferometric modulators that operate in accordance with the principles set forth above may vary widely. For example, FIGS. 8A-8B illustrate two exemplary alternative embodiments of the moving mirror structure which is part of the movable layer 14a in FIG. 7A. In FIG. 8A, the moveable reflective material 14 is attached to supports at the corners only, on tethers 32, which are preferably formed of a thermally responsive material, as discussed herein.

In FIG. 8B, the moveable reflective material 14 is suspended from a deformable layer 34, which includes the thermally responsive material. The reflective material 14 is supported and spaced from the transmissive layer 16 by support posts 38. Preferably, the deformable layer 34 is connected to the reflective material 14 by a thermal isolator 36, which inhibits heat transfer from the deformable layer 34 to the reflective material 14. The thermal isolator 36 advantageously both minimizes undesired heat loss to the reflective material 14 and also prevents undesired and, possibly non-uniform, expansion of the reflective material 14 due to heat transfer from the deformable layer 34. The embodiment of FIG. 8B has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of known techniques may be used to produce the above described structures involving a series of material deposition, patterning, and etching steps.

For example, the support posts 38 and the deformable layer 34 can be a single layer of material, with the support posts 38 formed by deposition into a hole and the deformable layer 34 formed by deposition on a planar surface. In other embodiments, the support posts 38 can be formed separately, e.g., by filling a hole, planarizing the resulting structure and then depositing the deformable layer 34 over the planarized surface. Moreover, additional structures can be formed over the support posts 38. For example, an additional conductive structure can be formed over the support posts 34 to form a conductive bus structure. This structure can be used to route electrical circuits along the back of the interferometric modulator.

Figure 9A:
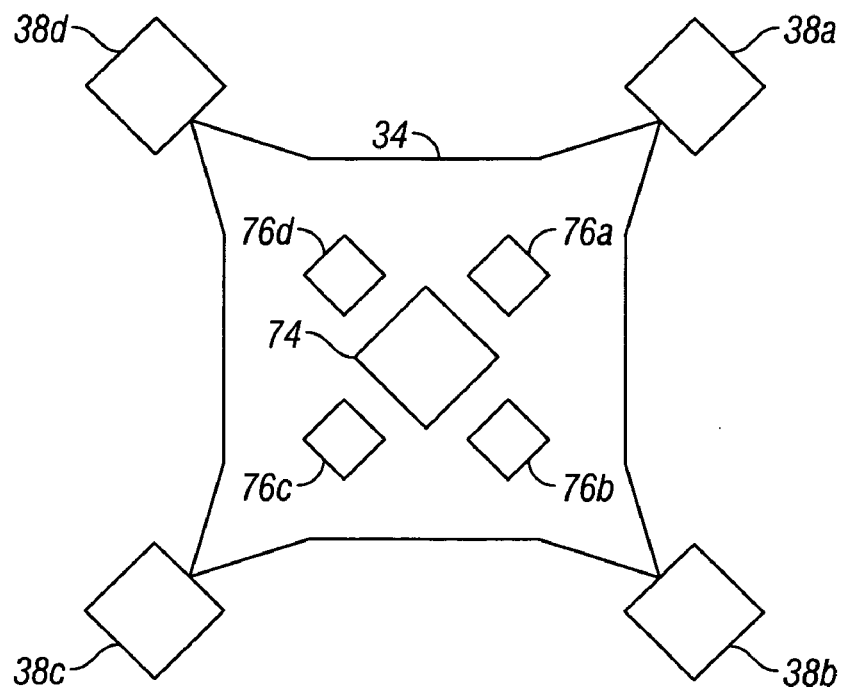
FIGS. 9A and 9B are top-down views of support structures for the reflective surfaces of interferometric modulators, in accordance with various preferred embodiments of the invention.
Figure 9B:
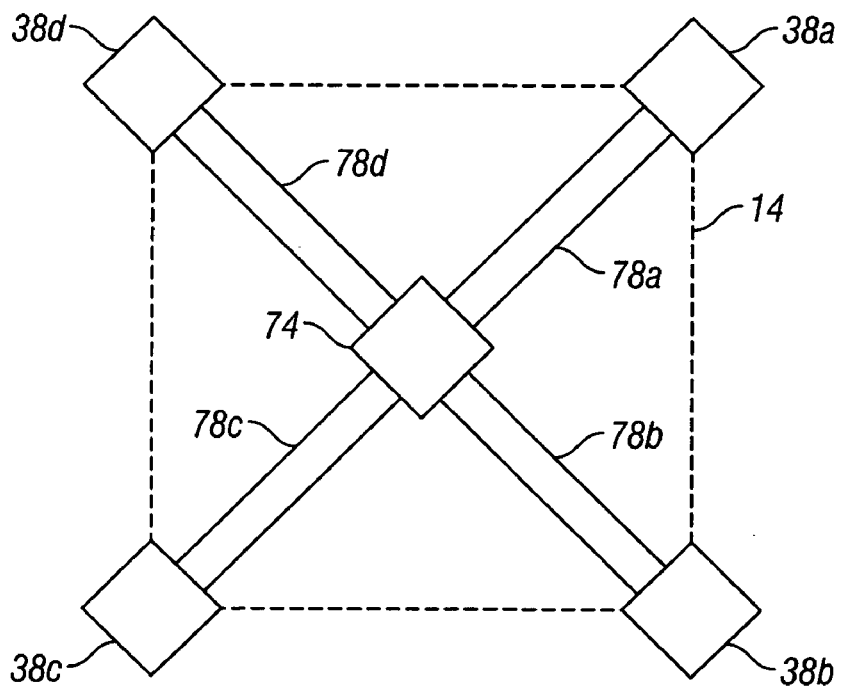

With reference to FIGS. 9A and 9B, the support posts 38 can support the deformable layer 34 and the reflective layer 14a in various ways different from that discussed above. For example, in FIG. 9A, a pattern in the form of a large center back support 74 is surrounded by four small supports 76a-76d. The center back support 74 and the four small supports 76a-76d serve to support the deformable layer 34. The layer 34 is shown patterned and removed from the edges of the membrane to separate it from adjacent modulator elements. In other embodiments, shown in FIG. 9B, the deformable layer 34 is patterned to form thin, linear straps 78a-78d connected to each support post 38a-38d. The straps are attached to the reflective layer 14a (FIG. 8B) by a center support 74. These two alternatives, among many others, affect and can be used to optimize the freedom of movement of the mirror and the detailed mechanical characteristics of that movement.

Figure 10:
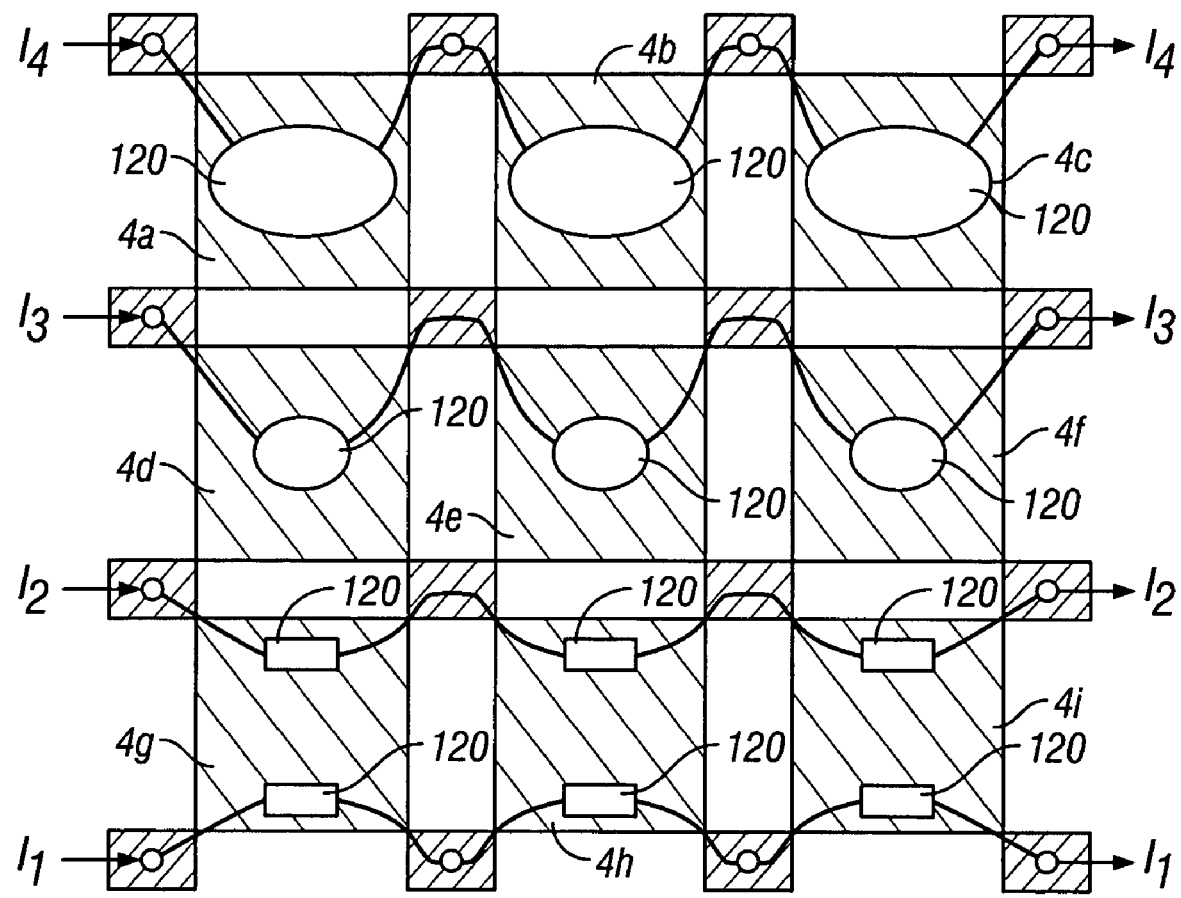
FIG. 10 shows a portion of a display having a 3×3 array of interferometric modulators, in accordance with various preferred embodiments of the invention.

In addition to variably controlling the separation between the layers 14a and 16a, one method of forming color pixels is to construct interferometric modulators having different spacing between the layers 14a and 16a, such that the interference achieved in these interferometric modulators result in the colors red, green and blue. FIG. 10 shows a layout view of a 3×3 array of interferometric modulators, each interferometric modulator 4a-4i has one or more heating elements 120, which can have the same or different configurations from one another. The interferometric modulators can be about 25-60 microns on a side, resulting in about 400-1,000 dots per inch. Many interferometric modulators can be grouped and driven together as a pixel, or sub-pixel in a monochrome, color, or grayscale display. For example, each interferometer modulator 4a-4i can correspond to a single display pixel in a monochrome display. For color or grayscale displays, the color or intensity of each interferometric modulator is determined by the size of the air gap between the optical and mechanical layers. Multiple sub-elements having different intensities or colors form a grayscale or color pixel. To create a flat panel display, a large array of interferometric modulators 4a-4i are fabricated in the desired format and packaged.

FIG. 10 shows nine elements, three for each of the colors red, green and blue. The modulators 4(a), 4(d), 4(g) may correspond to blue, 4((b), 4(e), 4(h) to green and 4(c), 4(f), 4(i) to red. These three different colors may be achieved by varying the distance between the reflective layers 14a, 14b and the transmissive layers 16a, 16b (FIG. 6) in the actuated position. When the reflective layers 14a, 14b are heated and expand, the reflective layers 14a, 14b may all move a uniform distance from the transmissive layers 16a, 16b or they may all move different distances from the transmissive layers 16a, 16b. Indeed, all nine modulators may traverse the entire cavity and move to a near position that brings them into direct contact with the substrate. Controlling the mechanical properties and/or the physical restraints of the supports may result in three different separation distances between the layers 14a, 14b and 16a, 16b, and, thus, three different pixel colors can be created. Preferably, the interferometer modulators 4a-4i each have a stop layer (FIG. 7A) configured to space the layers 14a, 14b from the layers 16a, 16b at a desired distance in the actuated position.

In some embodiments, the characteristics of the thermally responsive material supporting the reflective layers 14a, 14b, or the heating elements 120, can be manipulated to cause the mirrors 38 to move different distances upon application of the same amount of power to the heaters. For example, the wiring density of the heating elements 120 can be different or different materials with different thermal coefficients of expansion can be used with different mirrors 38. In another alterative, the modulators can have the same structures, but differing amounts of heat energy, e.g., achieved by supplying different amounts of current to different heating elements 120, can applied to move the reflective layers 14a, 14b to give different colors.

In the embodiment illustrated in FIG. 10, driver chips (not shown) can be attached at the edge of a display incorporating the interferometer modulators 4a-4i, to regulate the application of current to the heating elements 120. For example, a row device driver connects to each row of the display to allow the row driver to selectively energize each row. Similarly, a column driver connects to each column of the display to allow the column driver to selectively energize each column. The timing of the column and row drivers determines when each interferometric modulator is thermal heated. For displays that include sub-elements or sub-pixels, a conductive bus may be utilized to control the individual sub-elements of the pixel.

The column and row drivers independently energize the rows and/or columns to thereby refresh each interferometric modulator 4a-4i. As mentioned above, a pixel may include a single interferometric modulator 4a-4i or an array of interferometric modulator 4a-4i. When a pixel includes multiple interferometric modulator 4a-4i or sub-elements, these sub-elements may be individually controlled or jointly controlled by the drivers depending on the design of the display. Individual control of the sub-elements or sub-pixels can be facilitated with the use of a conductive bus.

Figure 11A:
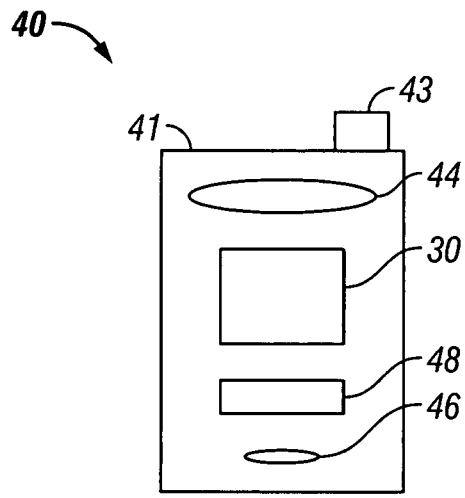
FIG. 11A is a system block diagram depicting a display device, in accordance with preferred embodiments of the invention.
Figure 11B:
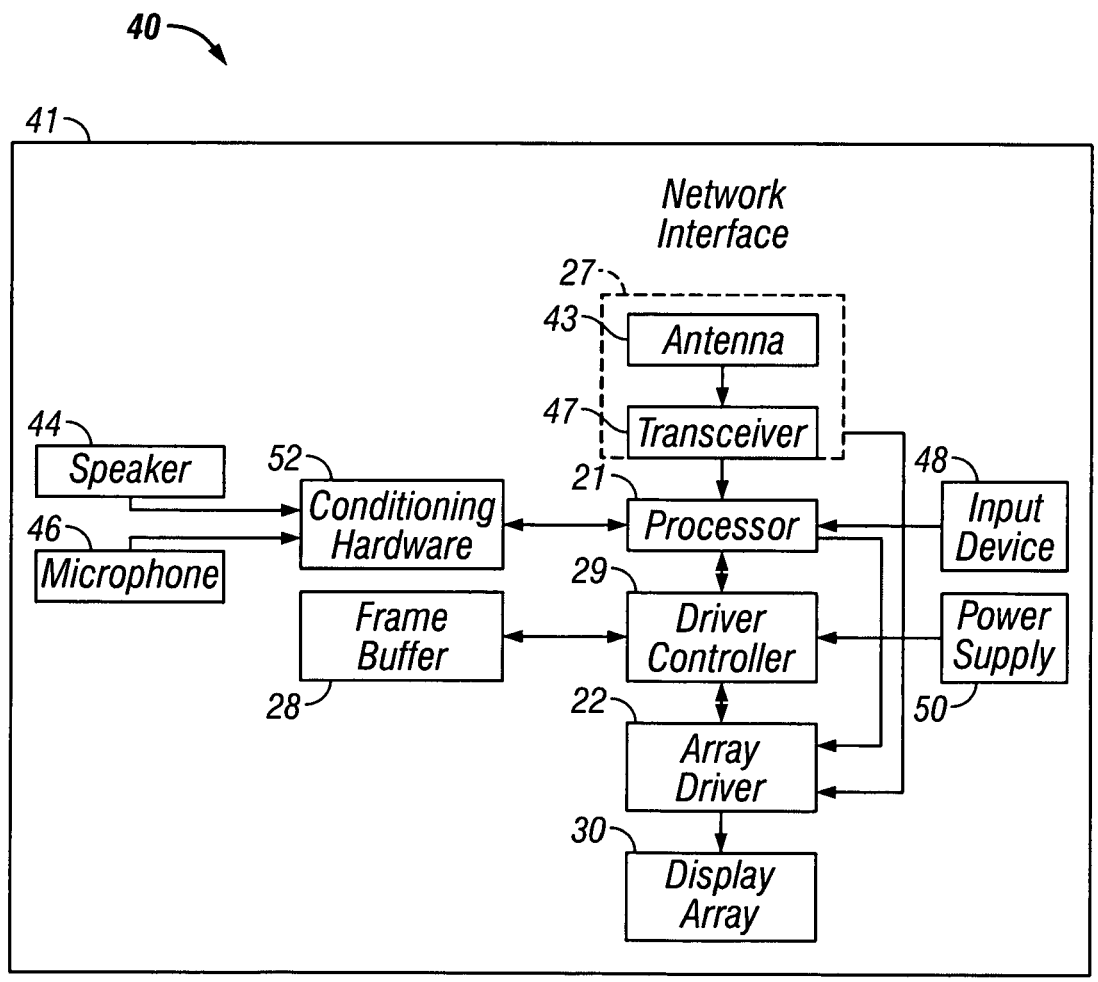
FIG. 11B is a system block diagram illustrating, in greater detail, some components of the display device of FIG. 11A.

FIGS. 11A and 11B are system block diagrams illustrating an embodiment in which the interferometric modulators described herein are incorporated in a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 44 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 44, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Moreover, various modifications can be made to the interferometric modulators described herein. For example, while shown for ease of illustration and description with reflective, movable layer that moves in relation to a fixed, transmissive layer, in other embodiments, the fixed layer may be heated and made to move. Moreover, both layers may be movable and provided with a thermally responsive material and heating elements.

In addition, the heat can be provided to the thermally responsive material by any know method of heat transport, including conduction, radiation or convection. For example, the heating element may simply be a part of a movable layer to which infrared radiation is directed.

Accordingly, it will be appreciated by those skilled in the art that various other omissions, additions and modifications may be made to the methods and structures described above without departing from the scope of the invention. All such modifications and changes are intended to fall within the scope of the invention, as defined by the appended claims.

We claim:

1. A display device, comprising:
   a plurality of display elements each comprising an interferometric light modulating device configured to produce interference resulting in at least one of the colors red, green and blue, each interferometric light modulating device comprising:
   a partially-reflective part;
   a reflective thermally-responsive movable part which moves relative to the partially-reflective part in response to changes of temperature, the movable part configured to reflect light through the partially-reflective part; and
   a heat source configured to heat the movable part to vary a distance between the partially-reflective part and the movable part,
   wherein the distance is different for interferometric light modulating devices corresponding to different ones of the colors red, green, and blue, the distance having a value to cause interference to result in one of the colors red, green and blue.

2. The display device of claim 1, wherein the heat source is in contact with the movable part.

3. The display device of claim 2, wherein the heat source is a resistive heater.

4. The display device of claim 3, wherein the resistive heater comprises a metal wire.

5. The display device of claim 4, wherein the heat source comprises a dielectric material disposed between and electrically insulating the metal wire from the movable part.

6. The display device of claim 5, wherein the dielectric material is an oxide.

7. The display device of claim 5, wherein the metal is chosen from the group consisting of nickel, chromium, nickel alloys, chromium alloys and nickel-chromium alloys.

8. The display device of claim 1, wherein the movable part comprises a thermally responsive material chosen from the group consisting of nickel, aluminum, nickel alloys, aluminum alloys, nickel-aluminum alloys, gold, platinum, rhodium, copper and silver.

9. The display device of claim 8, wherein the movable part comprises a layer of the thermally responsive material.

10. The display device of claim 1, wherein the movable part comprises at least two layers of material, wherein the layers of material have different thermal expansion coefficients.

11. The display device of claim 10, wherein the movable part comprises a bimetallic sandwich.

12. The display device of claim 11, wherein the bimetallic sandwich comprises a layer comprising nickel or copper and an other layer comprising iron or titanium.

13. The display device of claim 1, wherein the movable part is a mirror attached to and spaced from a support comprising a thermally responsive material.

14. The display device of claim 1, wherein the partially-reflective part has a fixed position.

15. The display device of claim 1, further comprising:
   a processor that is in electrical communication with the heat source, the processor being configured to process image data;
   a memory device in electrical communication with the processor.

16. The display device of claim 15, further comprising:
   a first controller configured to send at least one signal to the heat source; and
   a second controller configured to send at least a portion of the image data to the first controller.

17. The display device of claim 15, further comprising:
   an image source module configured to send the image data to the processor.

18. The display device of claim 17, wherein the image source module comprises at least one of a receiver, transceiver, and transmitter.

19. The display device of claim 15, further comprising:
   an input device configured to receive input data and to communicate the input data to the processor.

20. The display device of claim 1, wherein the heat sources comprise wiring elements, wherein the heat sources for some of the interferometric light modulating devices comprise a higher wiring density than the heat sources for others of the interferometric light modulating devices.

21. The display device of claim 1, wherein the reflective thermally-responsive movable parts of some of the interferometric light modulating devices have different thermal coefficients of expansion from others of the interferometric light modulating devices.

\* \* \* \* \*